United States Patent
Zhang et al.

(10) Patent No.: US 11,937,349 B2
(45) Date of Patent: Mar. 19, 2024

(54) DRIVE CIRCUIT FOR A DITIGAL DIMMING LED LIGHT

(71) Applicant: Shenzhen Hontech-Wins Electronics Co., Ltd., Shenzhen (CN)

(72) Inventors: Zhihua Zhang, Shenzhen (CN); Wencai Wei, Shenzhen (CN); Zhenting Fan, Shenzhen (CN)

(73) Assignee: Shenzhen Hontech-Wins Electronics Co., LTD., Shenzhen (CN)

( * ) Notice: Subject to any disclaimer, the term of this patent is extended or adjusted under 35 U.S.C. 154(b) by 0 days.

(21) Appl. No.: 17/975,045

(22) Filed: Oct. 27, 2022

(65) Prior Publication Data

US 2023/0380027 A1 Nov. 23, 2023

(30) Foreign Application Priority Data

May 23, 2022 (CN) .......................... 202210564662.6

(51) Int. Cl.
*H05B 45/10* (2020.01)
*H05B 45/38* (2020.01)

(52) U.S. Cl.
CPC ............. *H05B 45/10* (2020.01); *H05B 45/38* (2020.01)

(58) Field of Classification Search
CPC ............................... H05B 45/10; H05B 45/38
See application file for complete search history.

(56) References Cited

U.S. PATENT DOCUMENTS

| | | | |
|---|---|---|---|
| 2010/0079203 A1* | 4/2010 | Furutani ............ | G06K 19/0723 327/564 |
| 2020/0100348 A1* | 3/2020 | Xiong .................... | H05B 45/10 |
| 2023/0108925 A1* | 4/2023 | Van Den Biggelaar .. | G01J 1/44 315/151 |

* cited by examiner

*Primary Examiner* — Minh D A
(74) *Attorney, Agent, or Firm* — David G. Woodral

(57) ABSTRACT

Disclosed is a drive circuit for a digital dimming LED light, relating to the LED light drive circuits, which includes a power module and a dimming module corresponding to the LED lights, wherein the dimming module comprises a demodulation unit, a boosting constant voltage unit and a constant current chopper unit, and the power module is used to convert a utility power into DC power and output it to the demodulation unit, and to receive an external dimming signal and modulate and convert it into a digital signal. The demodulation unit is connected to the power module for receiving and demodulating the digital signal, the constant current chopper unit is connected to the demodulation unit, and both the boosting constant voltage unit and the constant current chopper unit are connected with the LED lights, so that the brightness of the LED lights is consistent.

9 Claims, 5 Drawing Sheets

DRIVE CIRCUIT FOR A DITIGAL DIMMING LED LIGHT

CROSS-REFERENCE TO RELATED CASES

This application claims the benefit of Chinese patent application Serial No. 202210564662.6, filed on May 23, 2022, and incorporates such application by reference into this disclosure as if fully set out at this point.

FIELD OF THE INVENTION

The present disclosure relates to a drive circuit for an LED light, and more particularly, to a drive circuit for a digital dimming LED light.

BACKGROUND OF THE INVENTION

LED lights are widely used in the poultry industry. When wires of the traditional DC 48V LED light circuit in the breeding house exceed a certain length, such as 120 meters, the line voltage drop will increase due to the low voltage and high current, such that there is a significant difference in the brightness among the LED lights in the front and rear areas of the breeding house when the brightness is up to 100% in particular, which affects the breeding efficiency.

SUMMARY OF THE INVENTION

In order to address the deficiencies of the prior art, the present disclosure provides a drive circuit for a digital dimming LED light.

The technical solution adopted by the present disclosure to solve the above technical problems is: a drive circuit for a digital dimming LED light, which includes a power module and a dimming module corresponding to the LED lights, wherein the dimming module includes a demodulation unit, a boosting constant voltage unit and a constant current chopper unit, and the power module is used to convert a utility power into DC power and output the DC power to the demodulation unit, and is further used to receive an external dimming signal and modulate and convert the external dimming signal into a digital signal; the demodulation unit is connected to the power module for receiving and demodulating the digital signal, the constant current chopper unit is connected to the demodulation unit, and both the boosting constant voltage unit and the constant current chopper unit are connected to the LED lights, so that the voltage and current of the LED lights are constant, and the brightness of the LED lights is consistent by adjusting the brightness of the LED lights based on the demodulated signal.

In the above circuit, the demodulation unit includes a demodulation chip U1, a voltage divider circuit and a first filter circuit, wherein the voltage divider circuit is connected to the power module, receiving the digital signal for voltage division, and the divided signal is filtered by the first filter circuit, demodulated by the demodulation chip U1, and transmitted to the constant current chopper unit.

In the above circuit, the demodulation unit further includes a first voltage regulator circuit and a second filter circuit, wherein the first voltage regulator circuit is connected to the power module for stabilizing the DC power output by the power module, and the DC power is filtered by the second filter circuit, and then output to the demodulation chip U1 to provide VCC power supply.

In the above circuit, the boosting constant voltage unit includes a voltage-boosting chip U2 and a voltage-boosting type DC/DC converter topology circuit, wherein the voltage-boosting chip U2 is connected to the voltage-boosting type DC/DC converter topology circuit, and the voltage-boosting type DC/DC converter topology circuit is connected to a positive input end of the LED light. The voltage-boosting chip U2 outputs its own PWM signal to the voltage-boosting type DC/DC converter topology circuit, and controls the voltage-boosting type DC/DC converter topology circuit to output a constant voltage to the LED lights.

In the above circuit, the boosting constant voltage unit further includes a second voltage regulator circuit and a third filter circuit, wherein the second voltage regulator circuit is connected to the power module for stabilizing the DC power output by the power module, and the DC power is filtered by the third filter circuit, and then output to the voltage-boosting chip U2 to provide the VCC power supply.

In the above circuit, the boosting constant voltage unit further includes a voltage feedback circuit, wherein the voltage feedback circuit includes a resistor R7 and a resistor R8 for voltage division, one end of the resistor R7 is connected to the voltage-boosting type DC/DC converter topology circuit, the other end of the resistor R7 is connected to one end of the resistor R8, and the other end of the resistor R8 is grounded. A first connection point is provided between the resistor R7 and the resistor R8, and the first connection point is connected to a feedback port FB of the voltage-boosting chip U2.

In the above circuit, the voltage feedback circuit further includes a capacitor C7 for a feedforward network, wherein the capacitor C7 is connected in parallel with the resistor R7. One end of the capacitor C7 is connected to the voltage-boosting type DC/DC converter topology circuit, and the other end thereof is connected to the first connection point.

In the above circuit, the voltage feedback circuit further includes a capacitor C5 for high-frequency filtering, one end of the capacitor C5 connected to the feedback port FB of the voltage-boosting chip U2, and the other end grounded.

In the above circuit, the constant current chopper unit includes a resistor R22, a field effect transistor Q2, a resistor R27, a resistor R23 and a transistor Q4, wherein the resistor R22 is connected to the demodulation chip U1, receiving the PWM signal demodulated by the demodulation chip U1, and the other end of the resistor R22 is connected to a gate of the field effect transistor Q2, a drain of the field effect transistor Q2 is connected to a negative input end of the LED light, a source of the field effect transistor Q2 is connected to one end of the resistor R27, and the other end of the resistor R27 is grounded. A second connection point is provided between the resistor R22 and the gate of the field effect transistor Q2, and a third connection point is provided between the source of the field effect transistor Q2 and the resistor R27, wherein the second connection point is connected to a collector of the transistor Q4, a base of the transistor Q4 is connected to one end of the resistor R23, the other end of the resistor R23 is connected to the third connection point, and an emitter of the transistor Q4 is grounded.

The beneficial effects of this technical solution are: the LED lights can adapt to a wider input voltage range, from the original 36-54V to 20-60 Vdc, which can be even applied to a 150-meter-long breeding house, thereby achieving full length coverage of the breeding house. When the LED lights are at 100% high brightness or 1% low brightness, the brightness of the front and rear lights in a 150-meter-long breeding house is the same, meeting the needs of use, such that the brightness of the LED lights can be consistent at 1% brightness to 100% brightness. Furthermore, the BOM cost is 40% lower than the original solution, thereby achieving cost optimization.

DETAILED DESCRIPTION OF THE PREFERRED EMBODIMENTS

The present disclosure will be further described below in conjunction with the accompanying drawings and embodiments.

The concept, specific structure and technical effects of the present disclosure will be clearly and completely described below with reference to the embodiments and accompanying drawings, so that the purpose, characteristics and effects of the present disclosure can be fully understood. Apparently, the described embodiments are only some, but not all, embodiments of the present disclosure, and based on the embodiments of the present disclosure, other embodiments obtained by those skilled in the art without creative efforts shall fall within the protection scope of the present disclosure. In addition, all the coupling/connection relationships involved in the present disclosure do not necessarily mean that the components are directly connected, but refer to a better coupling structure by adding or reducing coupling accessories according to the specific implementation. Various technical features in the present disclosure can be combined interactively on the premise of not contradicting each other.

In the traditional solution, when wires in the breeding house exceed a certain length, the line voltage drop will increase due to the low voltage and high current, such that there is a significant difference in the brightness among the lights in the front and rear areas of the breeding house when the brightness is up to 100% in particular, which affects the breeding efficiency.

In order to solve such problem, a DC 48V dimming system has been proposed, which includes ① AC-DC 420W48V digital dimming power supply developed by the company, ② cables, ③ digital dimming LED lights, etc. The functions of each part of the system are as follows:

① AC-DC 420W48V, the digital dimming power supply, which can convert the AC utility power into DC 48V output for LED lights, and at the same time, can modulate and convert the 0-10V dimming signal of the external input to a digital signal through the microcontroller program within its interior, and can further transmit the signal to the driver of ② no voltage drop LED lights with ③ cables, thereby realizing dimming control;

② cables, the 2-core cables, which can not only transmit DC 48V power to the lights, but also transmit the digital dimming signal to the lights;

③ no voltage drop LED lights, which can output the PWM signal to control the circuit of the constant-current drive chip after the dimming signal is decoded through the single chip microcomputer software on the drive board, thereby realizing dimming.

Figure 1:
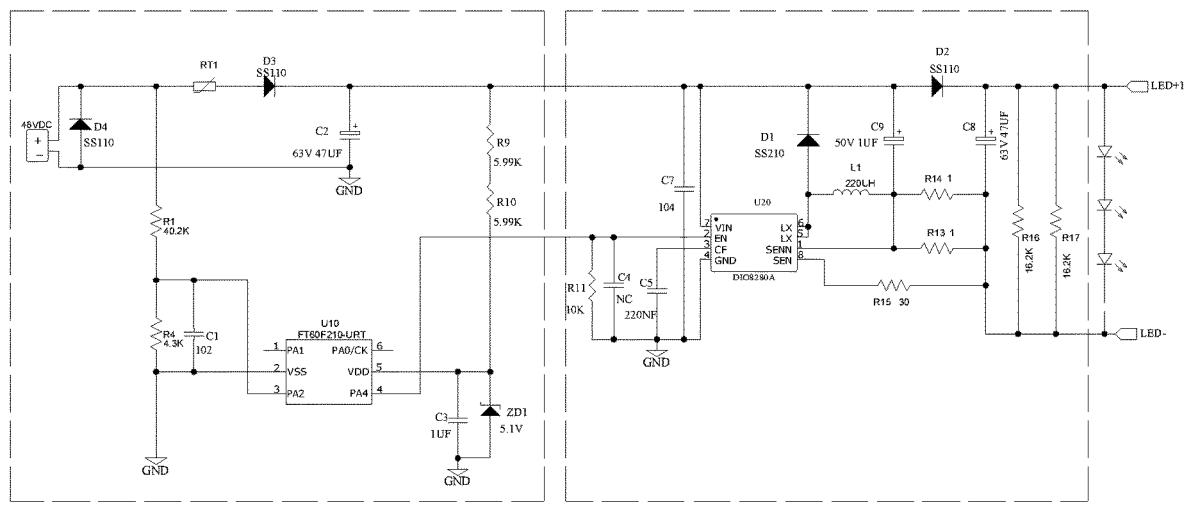
FIG. 1 is a circuit diagram of a DC 48V dimming system.

Furthermore, as the core part of the DC 48V dimming system, the operating principle of the digital dimming LED light will be described as below. The digital dimming LED light includes a software demodulation circuit and a step-down constant current drive circuit for PWM dimming, as shown in FIG. 1. For the software demodulation circuit, the digital signal from the AC-DC 420W48V digital dimming power supply is divided by resistor R1 and resistor R4, filtered by C1 and sent to pin U10-3, wherein U10 is the single chip FT60F210 of Fremont Micro Devices, embedded with the demodulation program, and U10 demodulates the dimming digital signal, and then outputs the 0-100% PWM signal from pin U10-4 to the U20 chip; resistor R9, resistor R10, and voltage-regulator diode ZD1 form a 5.1 V voltage-regulator circuit, and VCC power is provided to the U10 microcontroller after filtered by capacitor C3. For the constant current drive circuit, U20 adopts DIO8280 A chip of Diao Microelectronics, which supports constant-current drive LED chip for PWM dimming; Chip U20, inductor L1, diode D1, and capacitor C9 form a typical step-down type DC/DC converter topology circuit, whereas diode D2 and capacitor C8 is to maintain a stable voltage when lights are at low brightness, so that the lights do not flash; U20 is a current mode control chip, and its pin U20-2 is input the size of the dimming PWM signal, which determines the size of the pulse width output by U20-5 and U20-6, so as to control the magnitude of the output current for adjusting the brightness of the lights, wherein the higher the current, the brighter the light, and vice versa; pin U20-1 is the negative end of current detection (CS−), and pin U20-8 is the positive end of current detection (CS+), which is connected to the positive end of the current signal of resistors R13 and R14 through resistor R15; C7 is the VCC filter capacitor of U20, C5 is to filter out the AC ripple on the internal reference voltage of the IC, R11 is the dummy load of pin U1-4 outputting the PWM signal, R16 and R17 are the dummy loads located at the output of this circuit, which can stabilize the circuit at 1% brightness of lights; after pin U20-2 receives the PWM signal from pin U10-4, pins U20-5 and U20-6 output switching pulse, and when pin U20-2 is connected to GND, the current flows through diode D2, load LEDs, resistor R13, resistor R14, inductor L1, the 5th and 6th pins of the chip U2 to the 4th pin of the chip U20, forming a loop, and the inductor L1 and the capacitor C9 are charged at the same time; when the 5th pin and 6th pin of U20 is disconnected, capacitor C9, inductor L1, and diode D1 discharge, and the current also forms a loop through diode D2, capacitor C8, load LED, resistor R13, resistor R14, and capacitor C9.

This DC 48V dimming system mainly has the following two problems:

1. At 1% low brightness, the brightness of lights has a poor consistency. When the digital dimming LED light is at medium and high brightness, the brightness consistency of all LED lights performs well, but when it is dimmed to 1% low brightness, their brightness occurs to be inconsistent. The LED light only needs tens of μA—magnitude current to light up when it is slightly bright, but the driver of the LED light is provided with a step-down type DC/DC converter topology circuit, which needs to work in the continuous state of switching (the output ripple of the LED light should not be too large, otherwise the light will flash, so the chip cannot work in the intermittent mode), and then a minimum maintenance current of mA magnitude is required. The two currents are not in the same order of magnitude, therefore, due to the minimum operating current of the topology circuit, it is difficult to achieve a good consistency of the lights at 1% low brightness.

The actual test data is shown in Table 1 below.

| DI08208A constant current mode solution for PWM dimming, at 1% brightness | | |
|---|---|---|
| Sample | LED light voltage (V) | current (uA) at 1% brightness |
| 1 | 24.09 | 90 |
| 2 | 23.99 | 80 |
| 3 | 24.04 | 100 |
| 4 | 24.18 | 160 |
| 5 | 23.87 | 80 |
| 6 | 24.23 | 120 |
| 7 | 24.05 | 140 |
| 8 | 23.88 | 90 |
| 9 | 24.14 | 150 |
| 10 | 24.12 | 110 |
| | | 1120 |
| Aaverage value | | 112 |
| Maximum error | 48 | 42.9% |
| Minimum error | −32 | −28.6% |

It can be seen from Table 1 that, at 1% low brightness, among the 10 lights sampled, the current of the brightest LED light has a positive deviation of 42.9% compared with the average value. Apparently, the LEDs of this solution have a poor consistency at low brightness.

2. Its Application is limited. In the experimental test, the control room is provided with an AC-DC 420W48V digital dimming power supply, and a wire using a 2-core cable with a cross-sectional area of 1.5 square mm and a length of 120 meters, in the middle of which 46 5 W LED lights are evenly connected in parallel, wherein the measured voltage at the ends of the cable is 38V (this is a voltage drop generated at the low voltage and high current by the internal resistance of the cable and the contact resistance of the connector), however, when one more LED light is added, the flashing will occurs to lights. For the cause of this problem, taking the design of 10 strings of LED light beads as an example, the light bead voltage is normally 28.5-30V, but the topology circuit requires an input-output voltage difference >8V as this solution uses a step-down DC/DC converter topology, that is to say, the LED lights of this solution requires an input voltage >38V. At present, most of the breeding houses in the domestic poultry industry are within 120 meters in length, so the DC 48V dimming system can still be used, however, many foreign breeding houses have a length of 150 meters, it cannot meet the application requirements any more. Therefore, the DC 48V dimming system has application limitations, not allowing to meet the needs of breeding houses with longer length.

Figure 2:
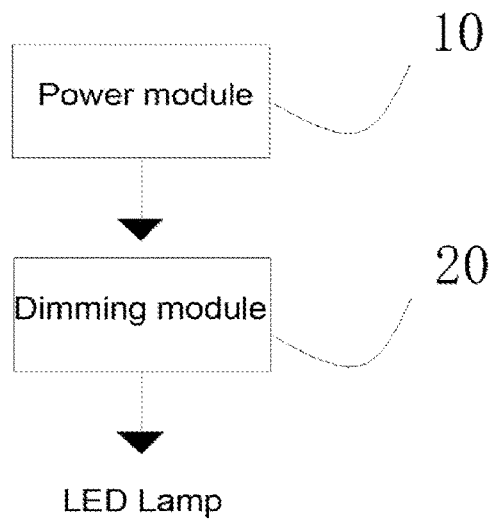
FIG. 2 is a structural block diagram of a drive circuit for a digital dimming LED light of the present disclosure.
Figure 3:
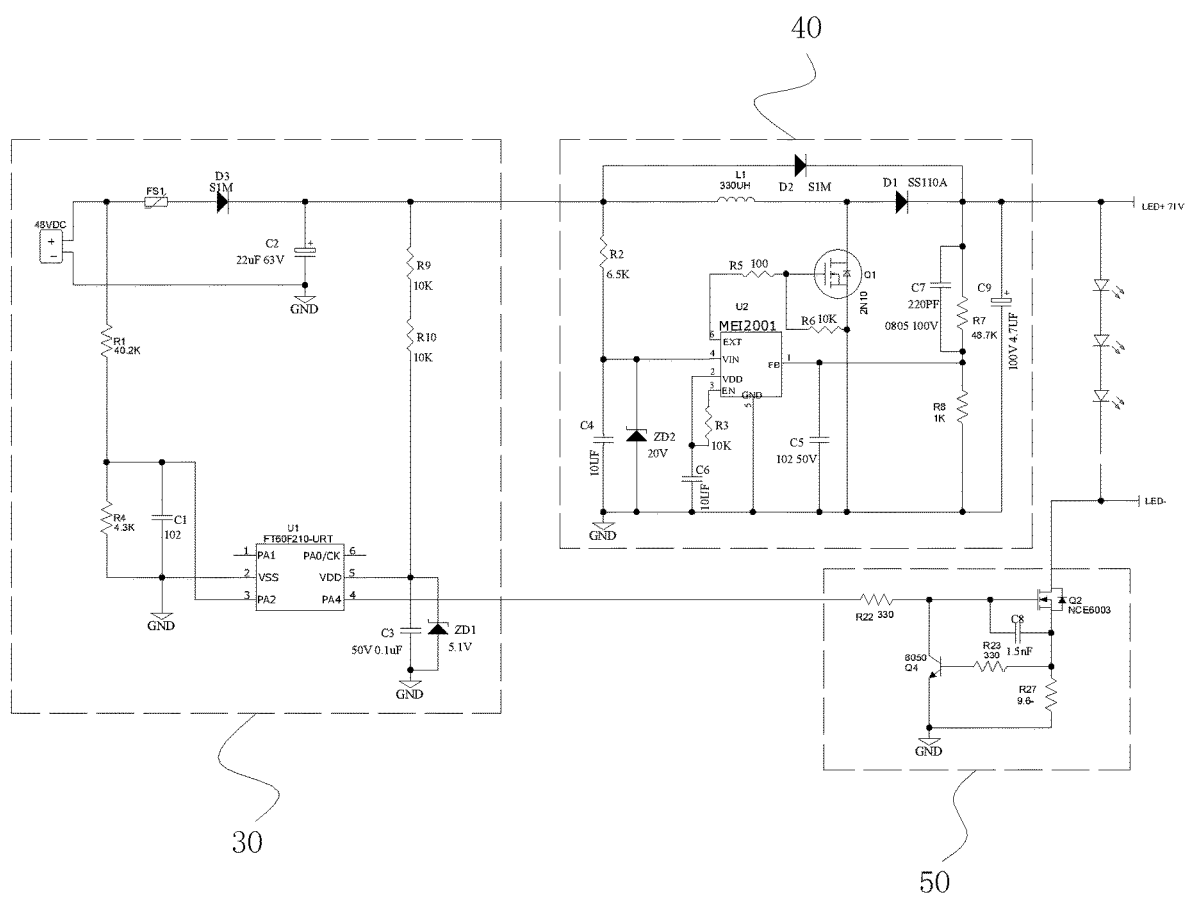
FIG. 3 is a schematic circuit diagram of a drive circuit for a digital dimming LED light of the present disclosure.

Referring to FIGS. 2 and 3, by optimizing the design solution, the present disclosure changes the circuit structure of the LED driver into the combination of a boosting constant voltage mode, linear constant current and PWM chopper dimming. It is provided with a drive circuit for a digital dimming LED light including a power module 10 and a dimming module 20 arranged corresponding to the LED lights, wherein the dimming module 20 includes a demodulation unit 30, a boosting constant voltage unit 40 and a constant current chopper unit 50, and the power supply module 10 includes an AC-DC 420W48V digital dimming power supply, which converts the AC utility power into DC 48V, provides power to the demodulation unit 30 through the cables, and modulates and converts the 0-10V dimming signal input from the exterior into a digital signal through the internal microcontroller program, and further transmits the digital signal to the demodulation unit 30 with the cables (it is conventional means in the art to transmit power and signals through the cables, so the detailed description of the internal structure and connection relationship of the cable in this solution are omitted). The demodulation unit 30 is connected to the power supply module 10 to receive and demodulate the digital signal, the constant current chopper unit 50 is connected to the demodulation unit 30 to receive the demodulated signal, and both the boosting constant voltage unit 40 and the constant current chopper unit 50 are connected to the LED lights, such that the brightness of the LED lights can be adjusted based on the demodulated signal, keeping the voltage and current on the LED lights stable so as to ensure the same brightness of the LED lights, and thereby realizing dimming control. The dimming modules 20 are arranged corresponding to the LED lights, and each LED light is provided with a dimming module 20, so that the brightness of the LED lights at different distances can be kept the same.

Figure 4:
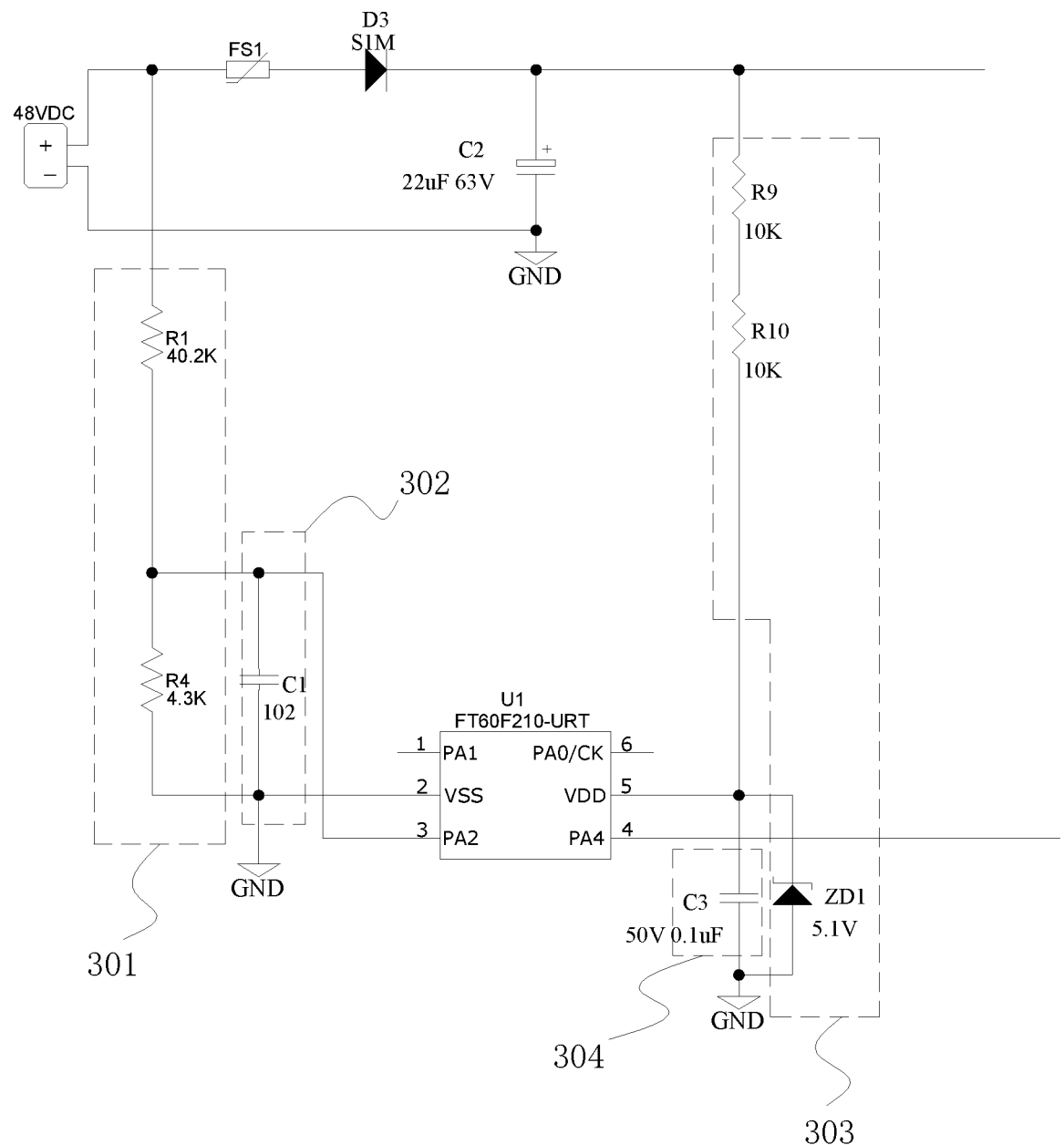
FIG. 4 is a circuit structure diagram of a demodulation unit in FIG. 3.

Referring to FIG. 4, the demodulation unit 30 includes a demodulation chip U1, a voltage divider circuit 301 and a first filter circuit 302, wherein the voltage divider circuit 301 includes a resistor R1 and a resistor R4, the first filter circuit 302 includes a capacitor C1; one end of the resistor R1 is connected to the power supply module 10, and the other end of the resistor R1 is connected to the resistor R4, such that the output DC 48V is received and the digital signal is received for voltage division; after the voltage-divided digital signal is filtered by the capacitor C1, it is output to a port PA2 of the demodulation chip U1, and demodulated by the demodulation chip U1. The model of the demodulation chip U1 is FT60F210-URT, embedded a demodulation program. After the signal demodulation, a 0-100% PWM signal is transmitted to the constant current chopper unit 50 from the port PA4 of the demodulation chip U1.

Furthermore, referring to FIG. 4, the demodulation unit 30 further includes a 5.1V first voltage regulator circuit 303 and a second filter circuit 304, wherein the first voltage regulator circuit 303 includes a resistor R9, a resistor R10 and a voltage regulator diode ZD1, the second filter circuit 304 includes a capacitor C3, and the first voltage regulator circuit 303 is electrically connected to the power supply module 10, such that the DC power output from the power supply module 10 is regulated and then filtered by the capacitor C3, and then output to the demodulation chip U1 to provide the VCC power supply.

Figure 5:
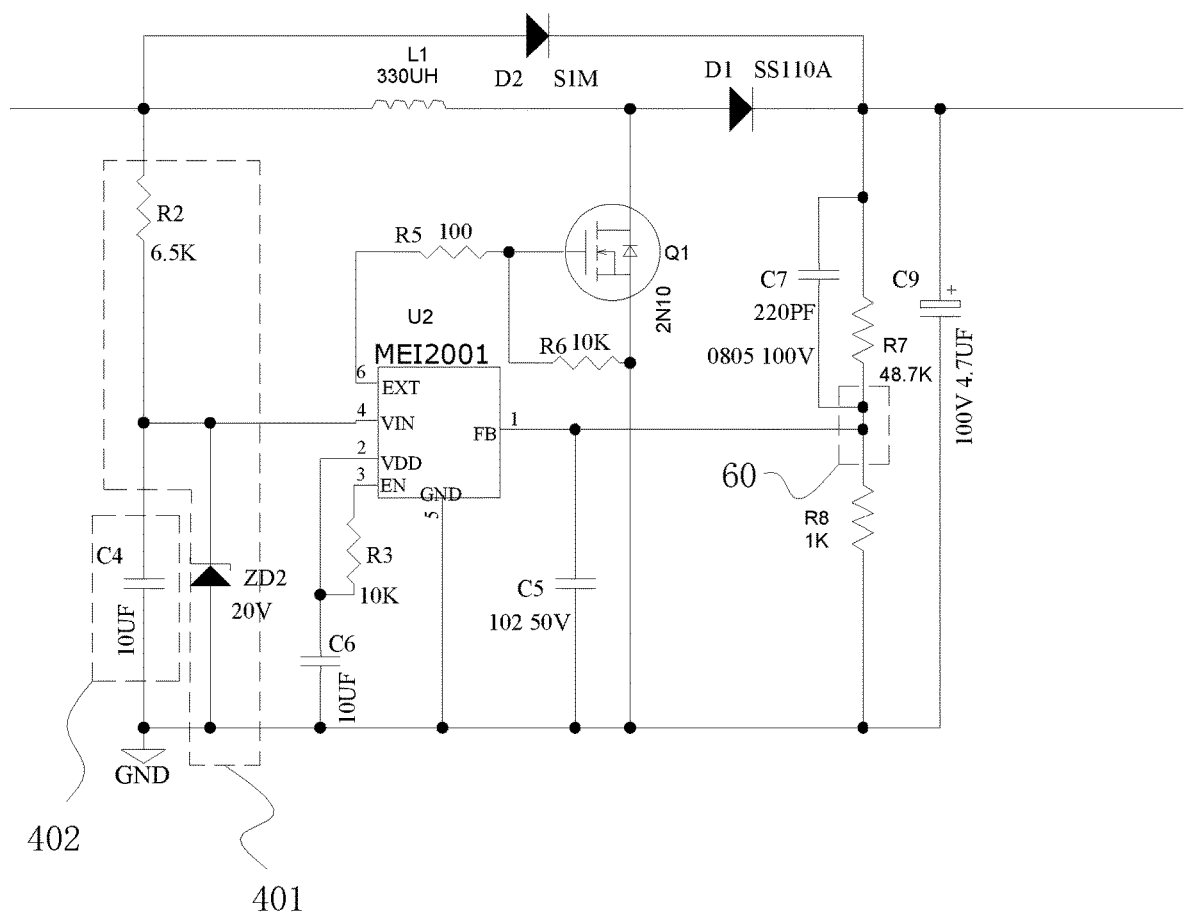
FIG. 5 is a circuit structure diagram of a boosting constant voltage unit in FIG. 3.

Referring to FIG. 5, the boosting constant voltage unit 40 includes a voltage-boosting chip U2 and a voltage-boosting type DC/DC converter topology circuit. The model of the voltage-boosting chip U2 is MEI2001, which is a DC-DC boost power supply control chip. The voltage-boosting chip U2 is connected with the voltage-boosting type DC/DC converter topology circuit, and the voltage-boosting type DC/DC converter topology circuit is connected to the positive input terminal of the LED lights. The PWM signal of the voltage-boosting chip U2 is output to the voltage-boosting type DC/DC converter topology circuit through the port EXT, so as to control the voltage-boosting type DC/DC converter topology circuit to output a constant voltage to the LED lights. The voltage-boosting type DC/DC converter topology circuit includes a field effect transistor Q1, an inductor L1, a rectifier diode D1 and a filter capacitor C9, wherein the type of the field effect transistor Q1 is 2N10.

Furthermore, referring to FIG. 5, the boosting constant voltage unit 40 further includes a second voltage regulator circuit 401 and a third filter circuit 402, wherein the second voltage regulator circuit 401 includes a resistor R2 and a voltage regulator diode ZD2, and the third filter circuit 402 includes a capacitor C4; one end of the resistor R2 is electrically connected to the power supply module 10, the other end is connected to the negative electrode of the voltage regulator diode ZD2; the positive electrode of the voltage regulator diode ZD2 is grounded, and the capacitor C4 is connected in parallel with the voltage regulator diode ZD2; one end of the capacitor C4 is connected to the resistor R2, and the other end is grounded. Therefore, the DC power output by the power module 10 is regulated, and then filtered by the capacitor C4, and then output to the power port VIN of the voltage-boosting chip U2 to provide VCC power to the voltage-boosting chip U2.

Furthermore, referring to FIG. 5, the boosting constant voltage unit 40 further includes a voltage feedback circuit, which includes a resistor R7 and a resistor R8 for voltage division, wherein one end of the resistor R7 is connected to the voltage-boosting type DC/DC converter topology circuit, and the other end is connected to the resistor R8, with the other end of the resistor R8 grounded; a first connection point 60 is provided between the resistor R7 and the resistor R8, connecting to the feedback port FB of the voltage-boosting chip U2. Further, the voltage feedback circuit also includes a capacitor C7 for a feedforward network, wherein the capacitor C7 is connected in parallel with the resistor R7, one end thereof is connected to the step-up DC/DC converter topology circuit, and the other end is connected to the first connection point 60. Further, the voltage feedback circuit also includes a capacitor C5 for high-frequency filtering, wherein one end of the capacitor C5 is connected to the feedback port FB of the voltage-boosting chip U2, and the other end is grounded.

When the input voltage input to the boosting constant voltage unit 40 is 20-60V, the port VIN of the voltage-boosting chip U2 serves as the VIN pin for the power supply, and the input voltage is regulated to 20V through the resistor R2 and the voltage regulator diode ZD2, and is input the port VIN after being filtered by the capacitor C4. The port VDD of the voltage-boosting chip U2 serves as the VDD pin, which is connected to the capacitor C6 for filtering. When the drive circuit for the digital dimming LED light of the present disclosure starts to operate, the port EXT of the voltage-boosting chip U2 outputs a 400 KHz PWM signal to control the gate of the field effect transistor Q1 and thereby control the on-off of the drain-source of the field effect transistor Q1. The field effect transistor Q1, boost inductor L1, rectifier diode D1, and filter capacitor C9 form a typical voltage-boosting type DC/DC converter topology circuit (the operating principle of the step-up DC/DC converter topology circuit is omitted here), outputting the 72V constant voltage. The voltage feedback is connected to the feedback port FB of the voltage-boosting chip U2 through the voltage divider network formed by the resistor R7 and the resistor R8 of the voltage feedback circuit, wherein the capacitor C7 belongs to the feedforward network, and the capacitor C5 is used for high frequency filtering. The port EXT of the voltage-boosting chip U2 serves as the output PWM drive pin, which is connected to the gate of the field effect transistor Q1 through the drive resistor R5, and the resistor R6 is the discharge resistor for the gate of the field effect transistor Q1.

Figure 6:
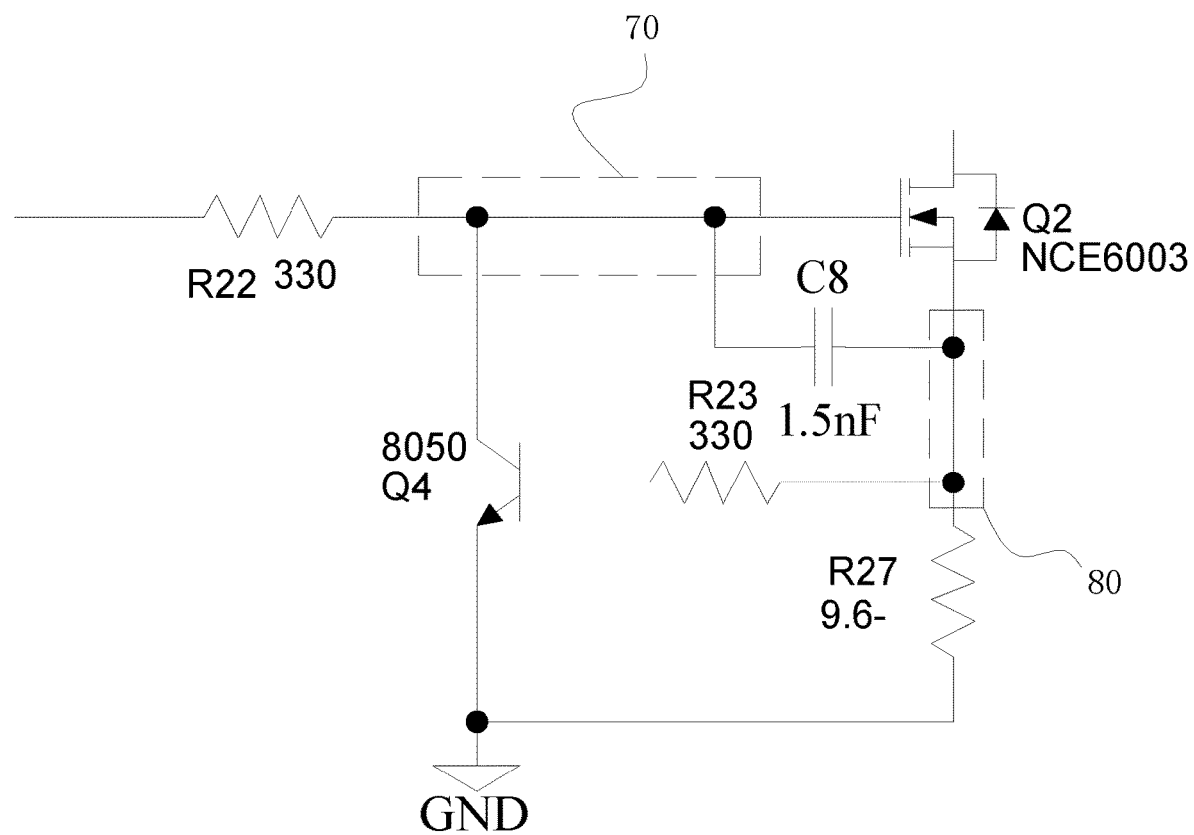
FIG. 6 is a circuit structure diagram of a constant current chopper unit in FIG. 3.

Referring to FIG. 6, the constant current chopper unit 50 includes a resistor R22, a field effect transistor Q2, a resistor R27, a resistor R23 and a transistor Q4, wherein the model of the field effect transistor Q2 is NCE6003, one end of the resistor R22 is connected to a port PA4 of the demodulation chip U1 to receive the PWM signal demodulated by the demodulation chip U1, and the other end of the resistor R22 is connected to the gate of the field effect transistor Q2, and the drain of the field effect transistor Q2 is connected to the negative input terminal of the LED lights, the source of the field effect transistor Q2 is connected to one end of the resistor R27, with the other end of the resistor R27 grounded; a second connection point 70 is provided between the resistor R22 and the gate of the field effect transistor Q2, and a third connection point 80 is provided between the source of the field effect transistor Q2 and the resistor R27; the second connection point 70 is connected to the collector of the transistor Q4, the base of the transistor Q4 is connected to one end of the resistor R23, with the other end of the resistor R23 connected to the third connection point 80, and the emitter of the transistor Q4 is grounded.

The PWM dimming signal from the port PA4 of the demodulation chip U1 passes through the drive resistor R22 and controls the gate voltage of the field effect transistor Q2. The field effect transistor Q2 is an N-channel transistor. The high level of the PWM dimming signal enables the field effect transistor Q2 to be turned on, and thus the LED lights can be lit up. The current of the lit LED light can stay constant. The current value can be calculated as follows: taking the 6 W light as an example, since the transistor Q4 is the NPN type, and the resistance value of the resistor R27 is 9.6Ω, 0.7V/9.6Ω=0.073 A. When the current flowing through the resistor R27 is equal to 0.07 A, the voltage applied to the base of the transistor Q4 reaches 0.7V, and the transistor Q4 will be turned on. At this time, the voltage of the gate of the field effect transistor Q2 is pulled down to the ground, and the field effect transistor Q2 is turned off, without current flowing through the resistor R27. Then, the base voltage of the transistor Q4 is pulled down to the ground, the transistor Q4 is turned off, and the gate of the field effect transistor Q2 is released, so the transistor Q4 is turned on again. This working cycle repeats, such that the final current in the circuit is stable at 0.07 A, and no matter how the boost power supply voltage changes, the current remains constant.

The gate of the field effect transistor Q2 is supplied with a PWM dimming signal with a frequency of 5 KHz, but human eyes can only see lights within the frequency of 35 Hz, and poultry eyes cannot feel such the flashing frequency either, for example, the eyes of chickens can only see lights within the frequency of 200 Hz, so people and poultry cannot see this light flashing. If the brightness of 1% is required, it is controlled by software to output a PWM with a duty cycle of 1%, and if the brightness of 100% is required, it is controlled by software to output a PWM with a duty cycle of 100%, thus realizing dimming.

Since there is a boosting constant voltage unit 40 in each LED light, as long as the input voltage is in the range of 20-60V, it is boosted to a stable 71V voltage, and the constant current chopper unit 50 can provide the constant current to each LED light, such that the voltage (V) and current (I) of each LED light can be keep constant, and further the power (P) thereof can be keep constant, thereby ensuring the consistent brightness of each LED light, therefore, the drive circuit for the digital dimming LED light of the present disclosure solves the voltage drop problem about the 48V lighting system. When the LED lights in the drive circuit for the digital dimming LED light operates at 1% low brightness, referring to the same operating principle as above, the current can be also constant at 0.073 A during 1% duty cycle of the high level in the PWM, and the current is 0A on the remaining 99% of the cycle. Due to the vision persistence effect, slightly bright lights can be seen. And, the PWM chopping frequency is 5 KHz, which is much higher than the eye recognition ability of humans and poultry, so humans and poultry cannot see the light-flashing phenomenon. Therefore, the LED lights of the drive circuit of the digital dimming LED light can achieve good brightness consistency even when the LED lights operate at a low brightness of 1%.

Due to the voltage-boosting type DC-DC converter topology circuit, in theory, the input/output voltage ratio can be several times or even hundreds of times (in the embodiment, the input voltage is required to be in the range of 20V-60 Vdc considering the minimum start-up voltage of VCC of the IC), and thus even if the breeding house has a length of 150 meters, the voltage at the end of the light line is above 25V, which is within the input voltage range for the LED light, such that the entire length of the breeding house can be covered. Moreover, ICs, transistors and MOS transistors with common functions are selected in the present disclosure, and thus the cost is reduced by about 40% compared with the prior art. Therefore, the drive circuit of the digital dimming LED light of the present disclosure makes the LED light adaptable to a wider input voltage range, from the original 36-54V to 20-60 Vdc, which can be applied to a 150-meter-long breeding house to achieve the length coverage of the entire breeding house. At 100% high brightness, the brightness of the front and rear lights in the 150-meter-long breeding house is consistent, thereby meeting the needs of use, and at 1% low brightness, the brightness of the front and rear lights in the 150-meter-long breeding house is also consistent, thereby meeting the needs of use, therefore, the brightness of LED lights is consistent at 1% to 100. Furthermore, the BOM cost is 40% lower than the original solution, and thereby achieving cost optimization.

The above is a specific description of the preferred implementation of the present disclosure, but the present disclosure is not limited to the embodiment, those skilled in the art can make various equivalent modifications or substitutions without departing from the spirit of the present disclosure, and these equivalent modifications or substitutions are all included within the scope defined by the claims of the present application.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

\* \* \* \* \*

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A drive circuit for a digital dimming LED light, comprising a power module and a dimming module corresponding to LED lights, wherein the dimming module comprises a demodulation unit, a boosting constant voltage unit and a constant current chopper unit, and the power module is used to convert a utility power into DC power and output the DC power to the demodulation unit, and is further used to receive an external dimming signal and modulate and convert the external dimming signal into a digital signal; wherein the demodulation unit is connected to the power module for receiving and demodulating the digital signal, the constant current chopper unit is connected to the demodulation unit, and both the boosting constant voltage unit and the constant current chopper unit are connected to the LED lights, so that the voltage and current of the LED lights are constant, and the brightness of the LED lights is consistent by adjusting the brightness of the LED lights based on a demodulated signal, and Wherein the demodulation unit comprises a demodulation chip U1, a voltage divider circuit and a first filter circuit, and the voltage divider circuit is connected to the power module, receiving the digital signal for voltage division, and the signal divided is filtered by the first filter circuit, demodulated by the demodulation chip U1, and transmitted to the constant current chopper unit.

2. The drive circuit of the digital dimming LED light according to claim 1, wherein the demodulation unit further comprises a first voltage regulator circuit and a second filter circuit, and the first voltage regulator circuit is connected to the power module for stabilizing the DC power output by the power module, and the DC power is filtered by the second filter circuit, and then output to the demodulation chip U1 to provide VCC power supply.

3. The drive circuit of the digital dimming LED light according to claim 1, wherein the boosting constant voltage unit comprises a voltage-boosting chip U2 and a voltage-boosting type DC/DC converter topology circuit, and the voltage-boosting chip U2 is connected to the voltage-boosting type DC/DC converter topology circuit, and the voltage-boosting type DC/DC converter topology circuit is connected to a positive input end of the LED light, the voltage-boosting chip U2 outputs PWM signal to the voltage-boosting type DC/DC converter topology circuit, and controls the voltage-boosting type DC/DC converter topology circuit to output a constant voltage to the LED lights.

4. The drive circuit of the digital dimming LED light according to claim 3, wherein the boosting constant voltage unit further comprises a second voltage regulator circuit and a third filter circuit, and the second voltage regulator circuit is connected to the power module for stabilizing the DC power output by the power module, and then the DC power is filtered by the third filter circuit, and then output to the voltage-boosting chip U2 to provide the VCC power supply.

5. The drive circuit of the digital dimming LED light according to claim 3, wherein the boosting constant voltage unit further comprises a voltage feedback circuit, and the voltage feedback circuit comprises a resistor R7 and a resistor R8 for voltage division, one end of the resistor R7 is connected to the voltage-boosting type DC/DC converter topology circuit, the other end of the resistor R7 is connected to the resistor R8, and the other end of the resistor R8 is grounded, and wherein a first connection point is provided between the resistor R7 and the resistor R8, and the first connection point is connected to a feedback port FB of the voltage-boosting chip U2.

6. The drive circuit of the digital dimming LED light according to claim 5, wherein the voltage feedback circuit further comprises a capacitor C7 for a feedforward network, and the capacitor C7 is connected in parallel with the resistor R7, one end of the capacitor C7 is connected to the voltage-boosting type DC/DC converter topology circuit, and the other end thereof is connected to the first connection point.

7. The drive circuit of the digital dimming LED light according to claim 6, wherein the voltage feedback circuit further comprises a capacitor C5 for high-frequency filtering, one end of the capacitor C5 is connected to the feedback port FB of the voltage-boosting chip U2, and the other end thereof is grounded.

8. The drive circuit of the digital dimming LED light according to claim 1, wherein the constant current chopper unit comprises a resistor R22, a field effect transistor Q2, a resistor R27, a resistor R23 and a transistor Q4, the resistor R22 is connected to the demodulation chip U1, and receives the PWM signal demodulated by the demodulation chip U1, the other end of the resistor R22 is connected to a gate of the field effect transistor Q2, a drain of the field effect transistor Q2 is connected to a negative input end of the LED light, a source of the field effect transistor Q2 is connected to the resistor R27, and the other end of the resistor R27 is grounded; wherein a second connection point is provided between the resistor R22 and the gate of the field effect transistor Q2, and a third connection point is provided between the source of the field effect transistor Q2 and the resistor R27, and the second connection point is connected to a collector of the transistor Q4, a base of the transistor Q4 is connected to one end of the resistor R23, the other end of the resistor R23 is connected to the third connection point, and an emitter of the transistor Q4 is grounded.

9. The drive circuit of the digital dimming LED light according to claim 1, wherein the demodulation unit further comprises a first voltage regulator circuit and a second filter circuit, and the first voltage regulator circuit is connected to the power module for stabilizing the DC power output by the power module, and the DC power is filtered by the second filter circuit, and then output to the demodulation chip U1 to provide VCC power supply.

* * * * *

UNITED STATES PATENT AND TRADEMARK OFFICE
CERTIFICATE OF CORRECTION

PATENT NO. : 11,937,349 B2
APPLICATION NO. : 17/975045
DATED : March 19, 2024
INVENTOR(S) : Zhihua Zhang et al.

It is certified that error appears in the above-identified patent and that said Letters Patent is hereby corrected as shown below:

On the Title Page

Item (54) and In the Specification, Column 1, Line 1, Title, "DRIVE CIRCUIT FOR A DITIGAL DIMMING LED LIGHT" should read "DRIVE CIRCUIT FOR A DIGITAL DIMMING LED LIGHT".

Signed and Sealed this
Twenty-first Day of May, 2024

Katherine Kelly Vidal
*Director of the United States Patent and Trademark Office*